United States Patent [19]
Schouw

[11] 3,730,298
[45] May 1, 1973

[54] SURFACE EFFECT VEHICLE
[75] Inventor: Arthur C. Schouw, Evart, Mich.
[73] Assignee: Commute Air, Inc., Pontiac, Mich.
[22] Filed: Mar. 2, 1971
[21] Appl. No.: 120,096

[52] U.S. Cl. ................................180/126, 180/120
[51] Int. Cl. .................................................B60v 1/12
[58] Field of Search....................180/120, 122, 126, 180/116

[56] References Cited
UNITED STATES PATENTS

| | | | |
|---|---|---|---|
| 3,066,753 | 12/1962 | Hurley et al. | 180/120 |
| 3,150,732 | 9/1964 | Walker | 180/122 |
| 3,208,543 | 9/1965 | Crowley | 180/116 X |
| 3,336,995 | 8/1967 | Farb et al. | 180/120 |
| 3,363,716 | 1/1968 | Cockerell | 180/122 |
| 3,486,577 | 12/1969 | Jackes | 180/126 X |

*Primary Examiner*—Kenneth H. Betts
*Attorney*—Hauke, Gifford & Patalidis

[57] ABSTRACT

A surface effect vehicle having an outer hull and an inner hull secured to a bottom wall which, in turn, has a plurality of longitudinal and transverse openings that are adapted to exhaust pressurized air from a chamber, defined by the inner hull, downwardly from the vehicle at a rate which is sufficient to generate a force to lift the vehicle vertically. A rotatably mounted fan, carried within the inner hull and a driven by a conventional engine, is adapted to draw air in through the outer hull and direct pressurized air through the openings. Longitudinal and transverse flaps respectively, pivotally mounted adjacent the bottom wall longitudinal and transverse openings, are adapted to be selectively manipulated to control the direction of the flow of pressurized air exhausted through the openings to selectively drive the vehicle forwardly or rearwardly.

9 Claims, 9 Drawing Figures

INVENTOR
ARTHUR C. SCHOUW
BY

Hauke Gifford & Patalidis

Attorneys

INVENTOR
ARTHUR C. SCHOUW
BY
Hauke Gifford & Patalidis
Attorneys

Patented May 1, 1973

INVENTOR
ARTHUR C. SCHOUW

BY
Hauke Gifford & Patalidis
Attorneys ated to be suspended on # 3,730,298

SURFACE EFFECT VEHICLE

BACKGROUND OF THE INVENTION

1. Field of the Invention

The present invention relates to vehicles adapted to be propelled over and above ground, more particularly relating to a surface effect vehicle adapted to travel over any type of surface such as land, ice, snow, water and the like, the surface effect vehicle being supported by several columns of air and propelled forwardly, rearwardly or turned by manipulating the direction of the air columns.

2. Description of the Prior Art

Surface effect vehicles have certain advantages in that they enable a vehicle to be constructed that transverses nearly any type of terrain without actually touching it as the vehicle is adapted to be suspended on a cushion of air and thus it may cross over sand, water and rough terrain where other conventional vehicles would not satisfactorily function. Vehicles which have been heretofore constructed have not been of any substantial commercial value as they are unduly large causing inefficiency in operation, as well as being expensive to manufacture. The expense in manufacturing such vehicles is due, in part, to the complicated controls necessary to guide the vehicle forwardly, rearwardly and to facilitate turning.

The prior art surface effect vehicles have generally utilized pressurizing means, such as a fan, for directing air at a high velocity downwardly to entrap air under pressure between the vehicle and the ground surface below the vehicle. A forward thrust usually is obtained by deflecting the downwardly moving air toward the rear, however, the magnitude of thrust so developed has been generally too small to function efficiently as a means for propulsion, and thus it has become necessary to use auxiliary propellers for forward thrust. Thus, the normal surface effect vehicle does not embody an integrated lift and propulsion system which has the ability to apply all available power to produce both vertical forces to lift the vehicle and lateral forces for propelling the vehicle and facilitating turning.

SUMMARY OF THE INVENTION

The present invention, which will be described subsequently in greater detail, comprises a surface effect vehicle having a chamber, the bottom wall of which has a plurality of openings through which pressurized air is directed at a sufficient force to maintain the vehicle at a selected distance above the ground. Each of the openings has a flap member adapted to be positioned at selected inclinations with respect to the path of the air to control the direction of the air exhausted through the openings, and thus provide a more efficient integrated control of the lift, thrust and lateral forces acting on the vehicle.

It is therefore an object of the present invention to provide a vehicle adapted to be propelled over surfaces at substantially greater heights and speeds than heretofore possible.

It is a further object of the present invention to provide a vehicle which can selectively produce either lift, thrust or lateral forces upon appropriate manipulation of the flow path of a plurality of air columns.

Other objects, advantages, and applications of the present invention will become apparent to those skilled in the art of surface effect vehicles when the accompanying description of an example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which.

DESCRIPTION OF THE PREFERRED EMBODIMENT

Figure 1:
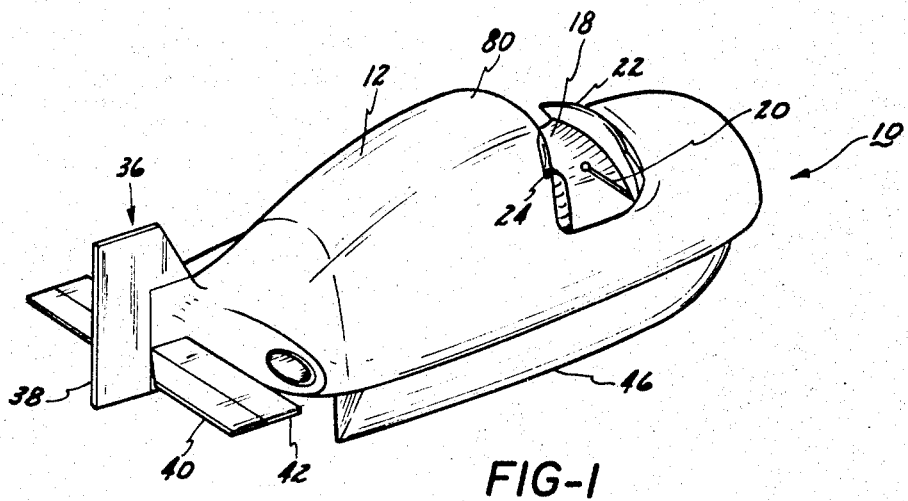
FIG. 1 is a perspective diagrammatic illustration of a ground effect vehicle constructed in accordance with the teachings of the present invention.

Referring now to the drawings and, in particular to FIGS. 1-5, there is illustrated an example of the present invention in the form of a surface effect vehicle 10 comprising an outer hull 12 and an inner hull 14 (FIG. 5), both of which are secured by any suitable means to a bottom wall 16. The hulls 12 and 14 are preferably constructed of a high impact plastic. The inner hull 14, except for certain openings, which will be described hereinafter, is completely enclosed to define a chamber 15 and is attached to the bottom wall 16 in an air-tight fashion. The upper forward portion of the vehicle 10 forms a cockpit 18 in which the pilot and passengers are seated and in which a control stick 20 for steering the vehicle is mounted. A suitable windshield 22 is provided around the front portion of the cockpit 18 to protect the occupants.

Figure 5:
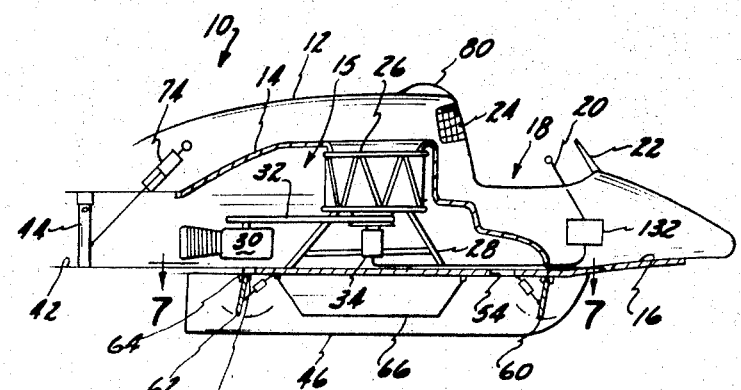
FIG. 5 is a fragmentary cross-sectional view of the surface effect vehicle as seen along line 5—5 of FIG. 2.

At the forward end of the vehicle 10 directly above the cockpit 18, a screened opening 24 is provided for the entry of air which, in turn, is directed into the interior of the inner hull 14 by means of a fan 26 (FIG. 5) rotatably mounted on a support frame 28 and driven by a conventional internal combustion engine 30, which is similarly supported within the interior of the inner hull 14. The fan 26 may be driven in any conventional manner such as by a belt and pulley arrangement 32 as shown in FIG. 5. The belt and pulley arrangement 32 also drives a fluid pump 34, which may be of any conventional type such as a gear or vane pump. The pump 34 is likewise supported by frame 28 and the purpose of pump 34 will be explained hereinafter. The exhaust from the gas engine 30 may be vented through any suitable conduit, not shown.

The vehicle 10 has a tail unit 36 with a vertically disposed rudder 38 adapted to pivot about a vertical axis to aid in steering the vehicle 10 as will be described in greater detail hereinafter. The tail unit 36 includes trim tabs 40 which function in the conventional manner to maintain the vehicle 10 level in flight and in particular when the vehicle 10 is subjected to crosswinds.

The rear of the inner hull 14 terminates in a pair of thrust tubes 42, which extend rearwardly and outwardly through the outer hull 12 on the opposite sides of rudder 38, for the purpose of exhausting the pressurized air from within the chamber 15 and rearwardly to aid in propelling the vehicle 10 in a forward direction. The amount of air exhausted through the thrust tubes 42 is controlled by thrust flaps 44 pivotally mounted within the inner hull 14 as shown in FIG. 5.

The vehicle 10 is further provided with a pair of outboard skirts or skegs 46 which support the vehicle 10 on the ground when the vehicle is not in operation. The skegs 46 extend across the intermediate portion of the vehicle 10 and, as can best be seen in FIG. 9, the skegs 46 have a triangularly shaped cross-section.

Figure 9:
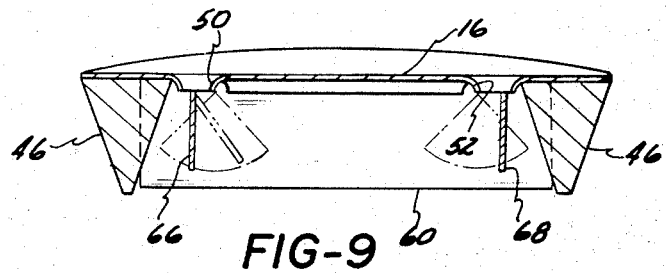
FIG. 9 is an enlarged fragmentary cross-sectional view of the surface effect vehicle taken along line 9—9 of FIG. 7.

As can best be seen in FIGS. 4-5 and 7-9, the bottom wall 14 of the vehicle 10 has a pair of spaced, rectangularly shaped longitudinal openings 50 and 52 disposed along axes which are parallel to the longitudinal axis of the vehicle 10, respectively on the left and right sides of the vehicle 10 as viewed in FIG. 9. A second pair of spaced, rectangularly shaped transverse openings 54 and 56 disposed along axes, which are perpendicular to the longitudinal axis of the vehicle 10, are located respectively forwardly and rearwardly of the opposite ends of the openings 50 and 52. Four smaller rectangular openings 58 are provided at the opposite ends of each of the side openings 50 and 52 adjacent the opposite ends of the front and rear openings 54 and 56. Each of the openings 50-58 is adapted to exhaust pressurized air from the chamber 15 and direct the air downwardly, generating a sufficient force to lift the vehicle 10 upwardly a predetermined height above the ground. The four corner openings 58 tend to generate four columns of air which stabilize the vehicle 10 and maintain the same in a level position when the vehicle 10 is in motion.

The direction and speed of the vehicle 10 may be controlled by selectively directing the flow from the openings 50, 52, 54 and 56 in a manner which will be described hereinafter in greater detail.

Figure 6:
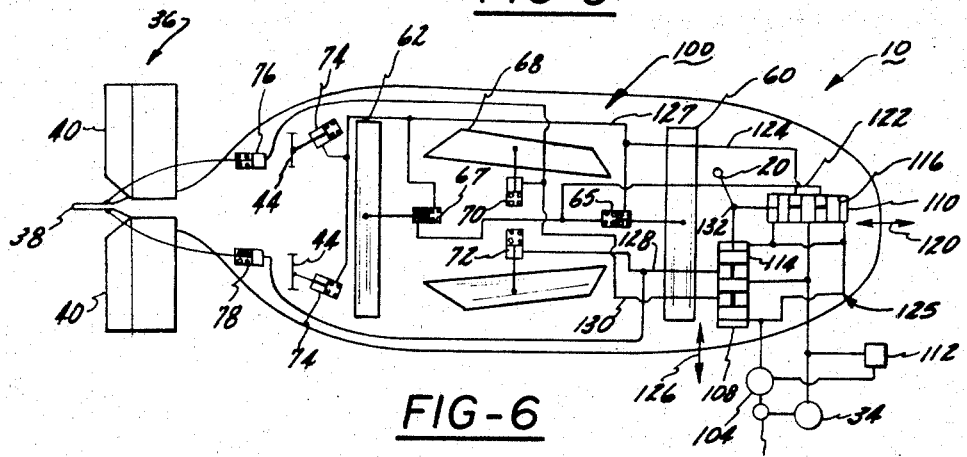
FIG. 6 is a bottom plane view of the surface effect vehicle, similar to FIG. 4, with a schematic diagram of a steering control system superimposed thereon.
Figure 7:
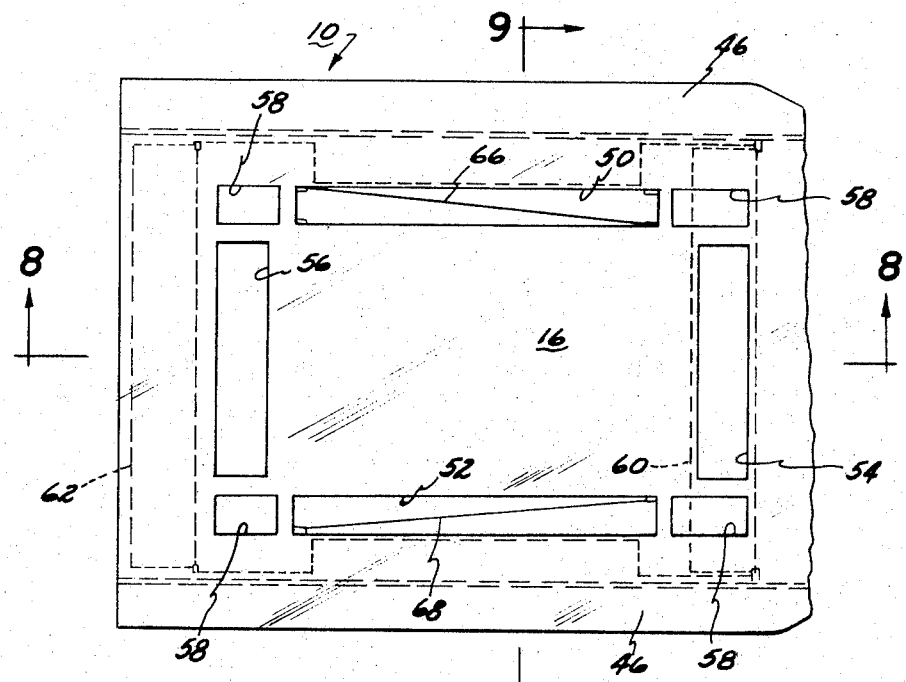
FIG. 7 is an enlarged fragmentary cross-sectional view of the surface effect vehicle as seen generally along line 7—7 of FIG. 5.
Figure 8:
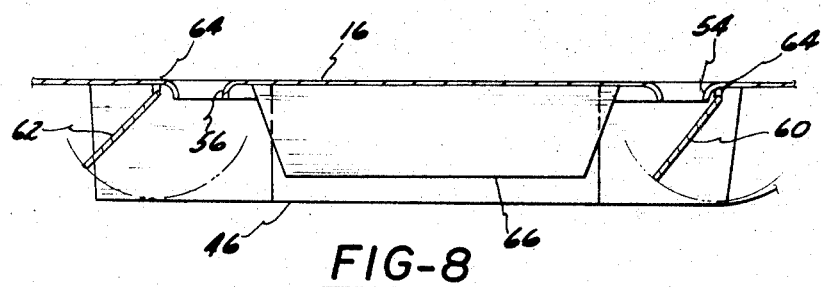
FIG. 8 is an enlarged fragmentary cross-sectional view of the surface effect vehicle taken along line 8—8 of FIG. 7.

A forward rectangularly shaped flap 60 and a rear rectangularly shaped flap 62, each having an upper edge pivotally mounted at 64 to the lower surface of the bottom wall 16, respectively, forwardly of the forward opening 54 and rearwardly of the rear opening 56. The forward and rearward flaps 60 and 62, normally disposed in a vertical plane, are adapted to be pivoted toward and away from their respective openings by fluid cylinders 65 and 67 respectively. Fluid cylinders 65 and 67, which are schematically illustrated in FIG. 6, are conventional cylinders having their housing pivotally secured to the lower surface of wall 16 and their actuating arms pivotally attached to their associated flaps 60 and 62. In a manner which will be described subsequently, the fluid cylinders 65 and 67 are actuated to pivot the forward and rearward flaps 60 and 62 to direct the air being exhausted from openings 54 and 56 in either a forward or rearward direction so as to propel the vehicle forwardly or rearwardly. The forward and rearward flaps 60 and 62 have a length which is approximately equal to the width between the inner surfaces of the outer skegs 46, such that the outer skegs 46 and the flaps 60 and 62 when in a vertical position define a rectangular cavity below the openings 50-58.

The left and right side openings 50 and 52 are similarly provided with a pair of side flaps 66 and 68 respectively. Left and right side flaps 66 and 68 are respectively disposed along a diagonal of each of the rectangularly shaped openings 50 and 52 and, when in a vertical position, the flaps 66 and 68 are disposed in planes which intersect along a line forward of the forward opening 54. Flaps 66 and 68 are pivotally mounted about their upper edges to the lower surface of the bottom wall 16 by any suitable means and are adapted to be pivoted about their respective diagonals by fluid cylinders 70 and 72 (FIG. 6) which are conventional fluid actuated cylinders having their housings pivotally carried by the wall 16, while their actuating rods are pivotally attached to their associated flaps 66 or 68.

It can thus be seen that as the forward and rear flaps 60 and 62 are pivoted respectively toward and away from their associated openings 54 and 56 the air, as can best be seen in FIG. 5, is directed rearwardly, thus propelling the vehicle 10 forwardly. If the forward and rearward flaps 60 and 62 are pivoted in an opposite direction, that is, respectively away and toward their associated openings 54 and 56, air will be directed from the openings 54 and 56 toward the front of the vehicle 10, thereby propelling the vehicle 10 rearwardly. At the same time the forward and rearward motion of the vehicle is had, the four columns of air generated by the four openings 58 tend to exert a vertical lift on the vehicle 10, maintaining it at a desired vertical height with respect to the ground.

As will be described hereinafter, the thrust flaps 44 in the thrust tubes 42 at the rear of the chamber 15 are adapted to be operated by fluid cylinders 74, which are adapted to open the thrust tubes 42 to permit a selected amount of the air in the chamber 15 to be exhausted therethrough when it is desired to propel the vehicle 10 forwardly, and thus the air exhausted through thrust tubes 42 tends to aid the vehicle 10 in attaining a substantial forward speed. The flaps 44, associated with the thrust tubes 42, are normally maintained closed when the vehicle is being propelled rearwardly.

When forward motion of the vehicle 10 is desired, the side flaps 66 and 68 are normally maintained in a vertical position, and thus air from the side openings 50 and 52 is directed downwardly along opposite sides of their associated flaps without exerting any lateral or turning forces on the vehicle 10. When it is desired to turn the vehicle 10, for example in a leftward direction, the forward and rearward flaps 60 and 62 remain in position to propel the vehicle 10 forwardly, while the left flap 66 is pivoted toward the longitudinal centerline of the vehicle 10, as shown in phantom in FIG. 9. The right flap 68 remains in a vertical position. It can thus be seen that a portion of the air passing through the opening 50 is directed by the pivoted flap 66 toward the right side of the vehicle 10, exerting a lateral force on the vehicle 10 which moves the same in a leftwardly direction. It should also be noted that a portion of the air being exhausted through the left opening 50 is directed around the outside of the left side flap 66 and continues to flow in a downward direction to aid in maintaining the vehicle 10 in a stable condition, while a portion of the air is being directed rightwardly by means of the side flap 66 to turn the vehicle 10 leftwardly. It should be further noted that the movement of the side flaps 66 or 68 has no effect on the direction of the four columns of air generated by the corner openings 58. Thus, the vehicle may be turned while maintaining a substantial amount of vehicle stability. At the same time that the vehicle 10 is turned leftwardly, the rudder 38 is turned toward the right by means of a conventional fluid cylinder 76.

To maneuver the vehicle 10 so as to turn the same in a rightwardly direction, the left flap 66 is maintained in a vertical position, while the right flap 68 is pivoted toward the longitudinal centerline of the vehicle 10, thereby directing a certain amount of the air exhausted from the opening 52 toward the left side of the vehicle, generating a lateral force on the vehicle 10 which tends to shift the same in a rightward direction. At the same time, a second conventional fluid cylinder 78 may similarly turn the rudder 38 toward the left to aid in turning the vehicle 10 rightwardly.

It can thus be seen that the lift, direction and speed of the vehicle 10 can be controlled only by positioning the front, rear and side flaps in the manner described.

In neutral position, that is, when the vehicle 10 is maintained at some selected vertical height above the ground in a non-moving position, the front, rear and side flaps are maintained in a vertical position while the thrust flaps 44 are closed, and thus all of the air is directed downwardly to maintain the vehicle at its selected height without imparting any forward, rearward or lateral forces to the vehicle 10.

Figure 2:
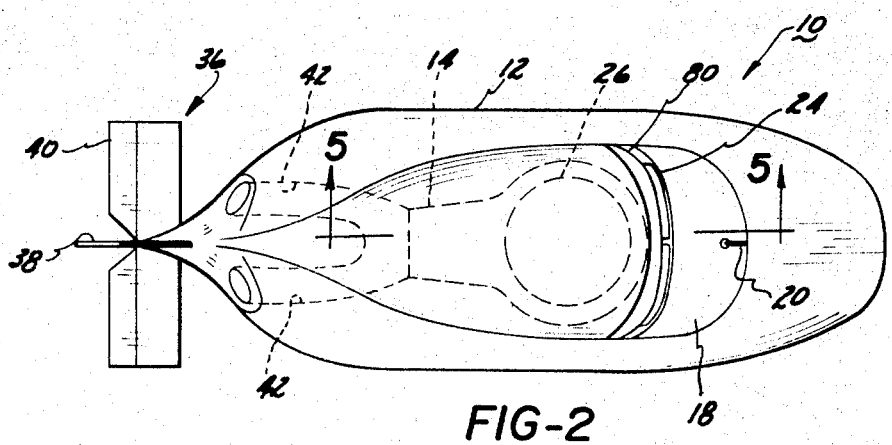
FIG. 2 is a top plan view of the surface effect vehicle illustrated in FIG. 1.
Figure 3:
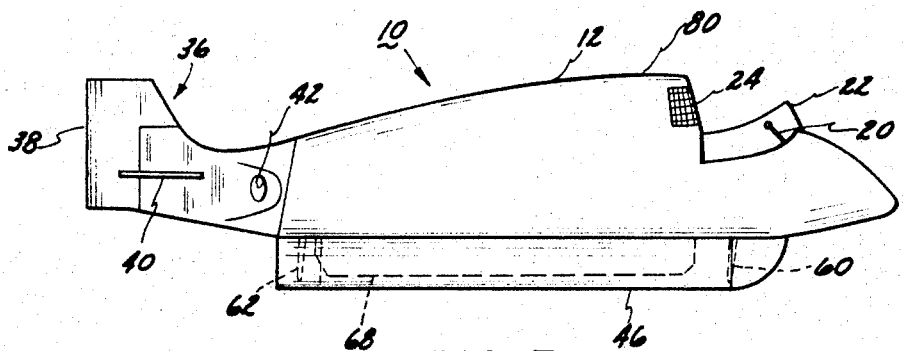
FIG. 3 is a side elevational view of the surface effect vehicle illustrated in FIG. 1.
Figure 4:
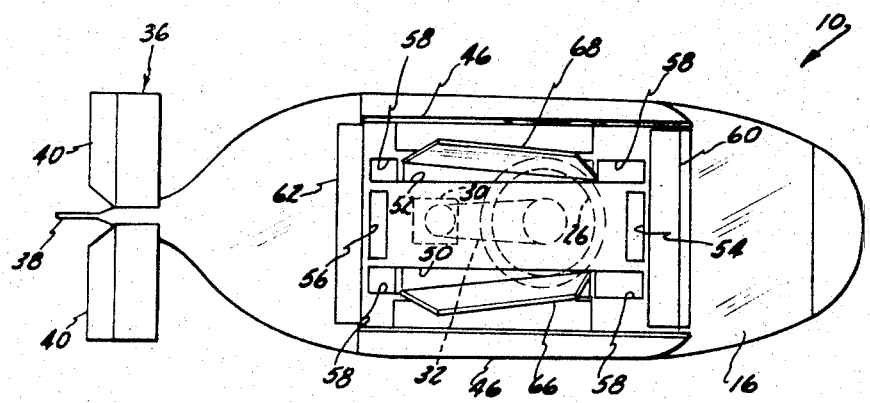
FIG. 4 is a bottom plan view of the surface effect vehicle illustrated in FIG. 1 with selected components deleted for purposes of clarity.

As can best be seen in FIGS. 1–3, the outer hull 12 has a contour in the form of an airfoil so that air passing thereacross as the vehicle is moving forwardly generates a lifting action somewhat similar to that of an aircraft wing. At the forward top edge of the outer hull 12 above the air intake 24, a ridge 80 is provided and functions as a boundary layer control at the upper surface of the vehicle 10, tending to increase the lift by reducing pressure on the upper surface. This results in more air being directed into the air intake 24 under the suction force of the fan 26 increasing the total lifting effect exerted on the vehicle 10.

Referring now to FIG. 6 one example of a control system 100 which may be employed to position the flaps 60, 62, 66 and 68 at a desired position relative to their associated openings 54, 56, 50 and 52 respectively is therein disclosed. Although the control system 100 is illustrated as a hydraulic control system, it should be noted that other types of control systems may be employed, such as pure mechanical, electro-mechanical, or electro-hydraulic.

The hydraulic control system 100 is schematically illustrated in FIG. 6 as comprising the fluid pump 34 adapted to draw a fluid, such as hydraulic oil, from a reservoir 104 through a conventional filter 106 and direct pressure fluid to conventional four-way directional control valves 108 and 110 through a suitable conventional tubing. A hydraulic high pressure relief valve 112 is provided in the system downstream from the pump 34 and is adapted to direct fluid back to the reservoir 104 when the system pressure exceeds a predetermined amount. Pressurized fluid is directed to the various cylinders heretofore described by positioning spools 114 and 116, respectively slidably disposed in directional control valves 108 and 110, by the control stick 20 which, in turn, is operated by the pilot of the vehicle 10. By moving the control stick 20 forwardly or rearwardly, as shown by the arrows 120, the spool 116 of the directional control valve 110 may be shifted so as to direct the fluid pressures selectively to fluid conduits 122 (or 124), while the other of the fluid conduits 124 (or 122) is vented back to the reservoir through exhaust conduits, all of which are designated by the numeral 125.

In the same manner, when the control stick 20 is shifted leftwardly or rightwardly, as indicated by the arrow 126, the spool 114 of the directional control valve 108 will be shifted in the conventional manner to direct pressurized fluid from the pump 34 to either a conduit 128 (or 130), while venting another conduit 130 (or 128) to the reservoir 104 through conduits 125. The connecting linkage, generally indicated by the numeral 132, between the control stick 20 and the spools 114 and 116 is adapted to shift either spool in any selected direction, depending upon what direction the pilot desires to maneuver the vehicle 10.

The hydraulic cylinders 65 and 67, which selectively control the position of the forward and rearward flaps 60 and 62, have springs disposed on the opposite sides of the fluid cylinder piston so as to normally bias the flaps 60 and 62 in a vertical position when their respective fluid cylinders 65 and 67 are not subject to pressure. The pistons within the fluid cylinders 65 and 67 divide their respective cylinders into two pressure chambers in the conventional manner. One of the pressure chambers in each cylinder 65 and 67 is in fluid communication with the conduit 124, while the other pressure chambers are in fluid communication with the conduits 122, such that when fluid pressure is directed to the conduit 122 by pulling the control stick 20 rearwardly, pressure acts on the pistons in the fluid cylinders 65 and 67 to pivot both flaps 60 and 62 forwardly, that is, the flap is pivoted away from the opening 54 to direct air to the front of the vehicle 10, while the flap 62 is pivoted toward its associated opening 56 to direct the air forwardly, thereby generating a force on the vehicle tending to propel the same to move rearwardly.

When the control stick 20 is shifted in a forwardly direction, the spool 116 of the control valve 110 connects fluid pressure to the conduit 124 which, in turn, is in fluid communication with the opposite sides of the fluid cylinders 65 and 67, whereby the pistons in the respective fluid cylinders are actuated to pivot their associated flaps 60 and 62 rearwardly, and thus the air being exhausted from the openings 54 and 56 is directed rearwardly to propel the vehicle 10 in a forward direction. At the same time, the conduit 124 is in fluid communication with cylinders 65 and 67 and fluid under pressure is communicated via a conduit 127 to the fluid cylinders 74, which in turn pivot the thrust flaps 44, opening the thrust tubes 42, whereby pressurized air from the chamber 15 is directed rearwardly to aid in propelling the vehicle 10 forward. The pistons within the fluid cylinders 74 are normally biased by springs to close the thrust flaps 44 so that when the control stick 20 is moved to a neutral or reverse position, the flaps 44 close tubes 42, and thus a forward motion is not imparted to the vehicle 10.

When the pilot desires to steer the vehicle 10 to either the left or the right, while the vehicle is being propelled, the pilot shifts the control stick 20 leftwardly or rightwardly (respectively downwardly and upwardly as viewed in FIG. 6). When the control stick 20 is shifted rightwardly (upwardly as viewed in FIG. 6), the spool 114 of the directional control valve 108 communicates pressure fluid from the pump 34 to a conduit 128 which, in turn, directs fluid under pressure to the fluid cylinder 70 associated with the side flap 68 on the right hand side of the vehicle 10 (as viewed in FIG. 9), pivoting the flap 68 toward the longitudinal centerline of the vehicle 10, wherein the vehicle 10 functions as hereinbefore described and steers in a rightwardly direction. The piston of fluid cylinder 70 is normally spring biased so as to maintain the flap 68 in a vertical position and thus, when pressure is relieved in the conduit 130, the flap 68 returns to its normal vertical position. At the same time the conduit 130 is in fluid communication with the fluid cylinder 70, fluid under pressure is communicated to the rudder cylinder 76 so as to shift the rudder leftwardly to aid in turning the vehicle as hereinbefore described.

When it is desired to steer the vehicle 10 leftwardly, the control stick 20 is shifted to the left (downwardly as viewed in FIG. 6) so as to communicate fluid to a conduit 128 which, in turn, pressurizes spring biased fluid cylinder 72 to cause its associated flap 66 to pivot towards the centerline of the vehicle 10, and thus directing a portion of the air exhausted from opening 50 to generate a lateral force as hereinbefore described to steer the vehicle 10 leftwardly. At the same time, the second spring biased cylinder 78, associated with the rudder 34, is actuated by fluid from the conduit 128, rotating the rudder rightwardly to aid in steering the vehicle 10 to the left.

It should be understood that the vehicle 10 may be turned leftwardly or rightwardly during any stage of forward or rearward motion.

It can thus be seen that the present invention discloses a new and improved surface effect vehicle which is more stable than vehicles heretofore available, and which is adapted to obtain higher speeds and greater heights, while being constructed in a simple and inexpensive manner.

Although only one embodiment of the present invention has been disclosed and described, it is to be understood that other forms and modifications may be had without departing from the spirit of the invention and the scope of the appended claims.

Having thus described the invention, what is claimed is as follows:

I claim:

1. A surface effect vehicle comprising: A surface effect vehicle comprising:

a body defining an enclosed chamber having a bottom wall with a pair of spaced longitudinal openings disposed along axes generally parallel to the longitudinal axis of said body, and forward and rear transverse openings disposed along axes generally perpendicular to the longitudinal axis of said body and extending between the opposite ends of said longitudinal openings;

means for pumping air into said chamber such that said air is exhausted through said openings at a sufficient rate to lift said vehicle vertically;

first and second flaps respectively disposed forwardly and rearwardly of said forward and rearward openings and carried by said bottom wall outside said chamber for pivotal movement about an axis paralleling the axes of their associated transverse openings between a vertical position and selected positions inclined toward and away from their associated openings;

third and fourth flaps carried by said bottom wall outside of said chamber respectively below said pair of longitudinal openings and adapted for pivotal movement about an axis inclined with respect to the axes of their associated longitudinal openings between a vertical position and selected inclined positions whereby when said third and fourth flaps are pivoted to an extreme position in one direction the forward portion of said longitudinal openings is closed and the rearward portion of said longitudinal openings is opened and when said third and fourth flaps are pivoted to an extreme position in an opposite direction the forward portion of said longitudinal openings is open and the rearward portion of said longitudinal openings is closed; and means for selectively positioning said flaps to control the flow path of the air exhausted through said openings.

2. The surface effect vehicle defined in claim 1 wherein said chamber has an aperture at the rear end thereof, and further comprising means for exhausting a selected amount of the air within said chamber through said aperture to aid in propelling said vehicle.

3. The surface effect vehicle defined in claim 1 further comprising vertical lift openings forwardly and rearwardly spaced from the opposite ends of said longitudinal openings and laterally spaced from the opposite ends of said forward and rear openings.

4. The surface effect vehicle defined in claim 1 wherein said third and fourth flaps are disposed along axes inclined with respect to longitudinal axis of said vehicle, said axes of said third and fourth flaps converging at a point forwardly spaced from said forward opening.

5. The surface effect vehicle defined in claim 1 wherein all of said openings are disposed in the same plane.

6. The surface effect vehicle as defined in claim 1 further comprising a pair of outer skegs outwardly spaced from said longitudinal openings and extending downwardly below said bottom wall, said outer skegs having outwardly inclined inner walls, and said skegs extending at least the length of said longitudinal openings.

7. The surface effect vehicle defined in claim 1 wherein said flap members are pivotally mounted about axes disposed in the same plane.

8. The surface effect vehicle defined in claim 1 further comprising an inner hull defining said enclosed chamber and an outer hull spaced from said inner hull; a fan mounted in said inner hull; and engine means for rotating said fan to draw air through said outer hull into said chamber and to exhaust said air through said openings.

9. The surface effect vehicle defined in claim 1 and in which said third and fourth flaps are individually controllable.

* * * * *